United States Patent [19]
Keh et al.

[11] Patent Number: 5,887,180
[45] Date of Patent: Mar. 23, 1999

[54] PATTERN RECOGNITION WITH N PROCESSORS

[75] Inventors: Stefan Keh, Radolfzell; Heiko Von Drachenfels, Konstanz, both of Germany

[73] Assignee: Licentia Patent-Verwaltungs-GmbH, Frankfurt, Germany

[21] Appl. No.: 702,496

[22] PCT Filed: Feb. 27, 1995

[86] PCT No.: PCT/EP95/00715

§ 371 Date: Oct. 28, 1996

§ 102(e) Date: Oct. 28, 1996

[87] PCT Pub. No.: WO95/23375

PCT Pub. Date: Aug. 31, 1995

[30] Foreign Application Priority Data

Feb. 28, 1994 [DE] Germany ............................ 44 06 919

[51] Int. Cl.[6] .................................................. G06K 9/62
[52] U.S. Cl. ............................... 395/800.01; 395/800.32; 382/209
[58] Field of Search ..................... 395/800.01, 800.32, 395/800.34; 382/209; 704/244, 243, 245

[56] References Cited

U.S. PATENT DOCUMENTS

| | | | |
|---|---|---|---|
| 5,345,586 | 9/1994 | Hamala et al. | 395/650 |
| 5,459,798 | 10/1995 | Bailey et al. | 382/218 |
| 5,588,074 | 12/1996 | Sugiyama | 382/209 |
| 5,668,897 | 9/1997 | Stolfo | 382/283 |

OTHER PUBLICATIONS

Carlo S. Regazzoni et al.: "Distributed hierarchical regularization system for recognition of planar surfaces". In: Optical Engineering, USA, vol. 32, No. 6 Jun. 1993 ISSN 0091–3286, pp. 1167–1192.

Richard F. Rashid: "An Inter–Process communication facility for UNIX". In: Local Networks for Computer Communications, Proceedings of the IFIP Working Group, Aug. 1980, Amsterdam, NL, pp. 319–354.

Giorgio Cattaneo et al.: "Chill Concurrency on Intel IAPX 432 Architecture". In: Microprocessing & Microprogramming, Netherlands, vol. 15, No. 5, May 1985, ISDSN 0165–6074, pp. 233–251.

Juergen Schuermann et al.: "Document Analysis—From Pixels to Contents". In: Proceedings of the IEEE, US, vol. 80, No. 7, Jul. 1992, ISSN 0018–9219, pp. 1101–1119.

Joseph K. Cross et al.: "Communication among distributed ADA Programs". In: Proceedings of the IEEE 1991, Dayton Oh, vol. 2, May 1991, New York, pp. 627–630.

Dieter Wybranietz et al.: "The LADY programming environment for distributed operating systems". In: Future Generation Computer Systems, NL, vol. 6, No. 3, Dec. 1990, ISSN 0167–739X, pp. 209–223.

*Primary Examiner*—Eric Coleman
*Assistant Examiner*—Mackly Monestime
*Attorney, Agent, or Firm*—Venable; George H. Spencer; Catherine M. Voorhees

[57] ABSTRACT

A method of pattern recognition is achieved by processes which comprise recognition algorithms in a multiple-process environment and a distributed data storage whose data model comprises objects, links for connecting objects, and attributes for writing, wherein the writing, reading and clearing of objects, links and attributes as well as the creation, opening, closing and elimination of data storages are effected by means of data access functions, and wherein each process is exclusively allocated a predetermined number of ports for reading input data and writing output data, and the exchange of data between processes is effected implicitly in that data portions are sent to the data storage or received due to the calling of the data access functions.

9 Claims, 2 Drawing Sheets

PATTERN RECOGNITION WITH N PROCESSORS

BACKGROUND OF THE INVENTION

The present invention relates to the area of pattern and type recognition, particularly a pattern-recognition system having N processors and a data storage for processes comprising application algorithms, the data model of the process being objects, links for connecting objects and attributes for describing objects.

As a consequence of the complex problems involved with pattern and type recognition, in the last few years a foundation has been developed which is analogous to object-oriented programming languages (OOPS) and object-oriented data models (OODM). The central idea in this case is that objects that can be conceptualized with all of the collected data of the pattern recognition and are to be represented explicitly are described. Data storage on a data model comprising objects for representing recognition objects, connections between objects for representing structural information for the recognized objects and attributes for describing objects is already known from the Proceedings of the IEEE, Vol. 80, pages 1116–1119, PMFT-Verbundproject F0brderkennzeichnen [PMFT Joint Project Special Identification ITM] 8501 A, Jan. 1, 1985–Mar. 31, 1989, pages 114 to 127. All recognition algorithms receive their input data from this data and store their output data there. Thus, a clear separation of the recognition algorithm aspects from the administration and control aspects can be attained. In particular, recognition algorithms can be developed to correspond specifically to the need. This is already apparent in the dependence of the recognition quality, for example the reading and error rates of address readers, on data records. In a given application, therefore, the algorithms that are always used are those that deliver better results, utilizing all prior knowledge of data records to be recognized in order to recognize them. In type-recognition systems, simple examples of data record characteristics that may be known in advance are font, type size, a limited vocabulary or the position that the type to be recognized occupies in a document. At the same time, the desire for reusability of the algorithms can be satisfied. The recognition methods should be embodied on different computer types having different operating systems, and also be adapted as easily as possible to new problems that arise.

Because recognition algorithms involve a great deal of calculation, the throughputs necessary in practical use can only be attained with parallel computers; a few processing steps must be supported with special hardware. The recognition systems known from the cited prior art are, however, conceptualized as single-process systems.

SUMMARY OF THE INVENTION

The object of the present invention is to disclose a method and an apparatus for pattern recognition with N processors, in which the heterogeneity of the system remains concealed from the recognition algorithms. This object is accomplished by the method of pattern recognition according to the invention wherein each process is exclusively allocated a predetermined number of ports for reading input data and writing input data and the exchange of data between processes is effected implicitly in that data portions are sent to the data storage or received due to the calling of the data access functions.

The pattern-recognition system of the invention offers great flexibility in the structure of different, communicating process systems. Recognition algorithms can be used in single-process or multiple-process systems without being altered. The system is particularly to be used as an efficient, configurable development platform for type-recognition software that can be scaled with respect to throughput.

Further advantageous embodiments of the invention ensue from the description and the dependent claims.

BRIEF DESCRIPTION OF THE DRAWINGS

The invention is described in more detail below in conjunction with drawings in which.

DETAILED DESCRIPTION OF THE INVENTION

Figure 1:
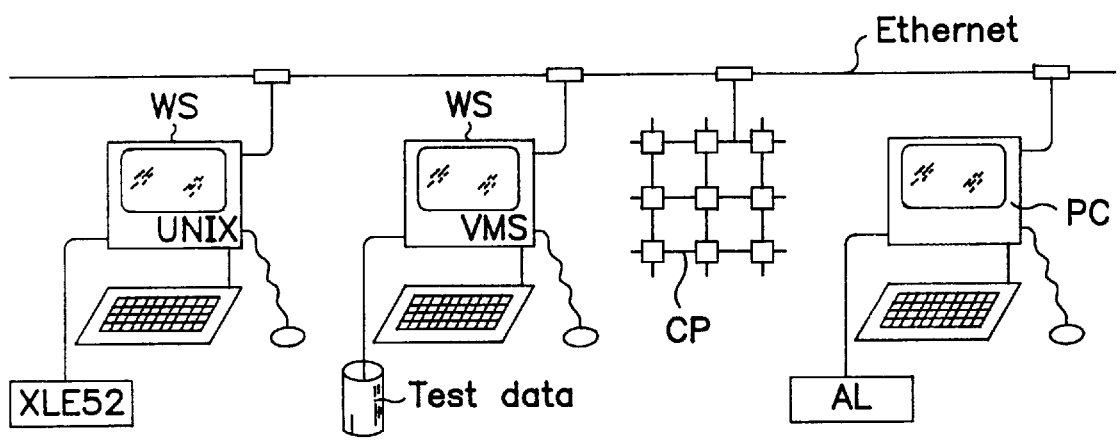
FIG. 1 shows a heterogeneous pattern-recognition system having N processors.

FIG. 1 shows a heterogeneous, integrated system for pattern recognition as used, for example, in type recognition. From documents, an address reader generates raw data for an N-processor system comprising PCs (PC), workstations (WS) and different co-processors (CP), which communicate with each other via a suitable network. This type of system is also particularly suitable for the simulation of recognition systems.

Figure 2:
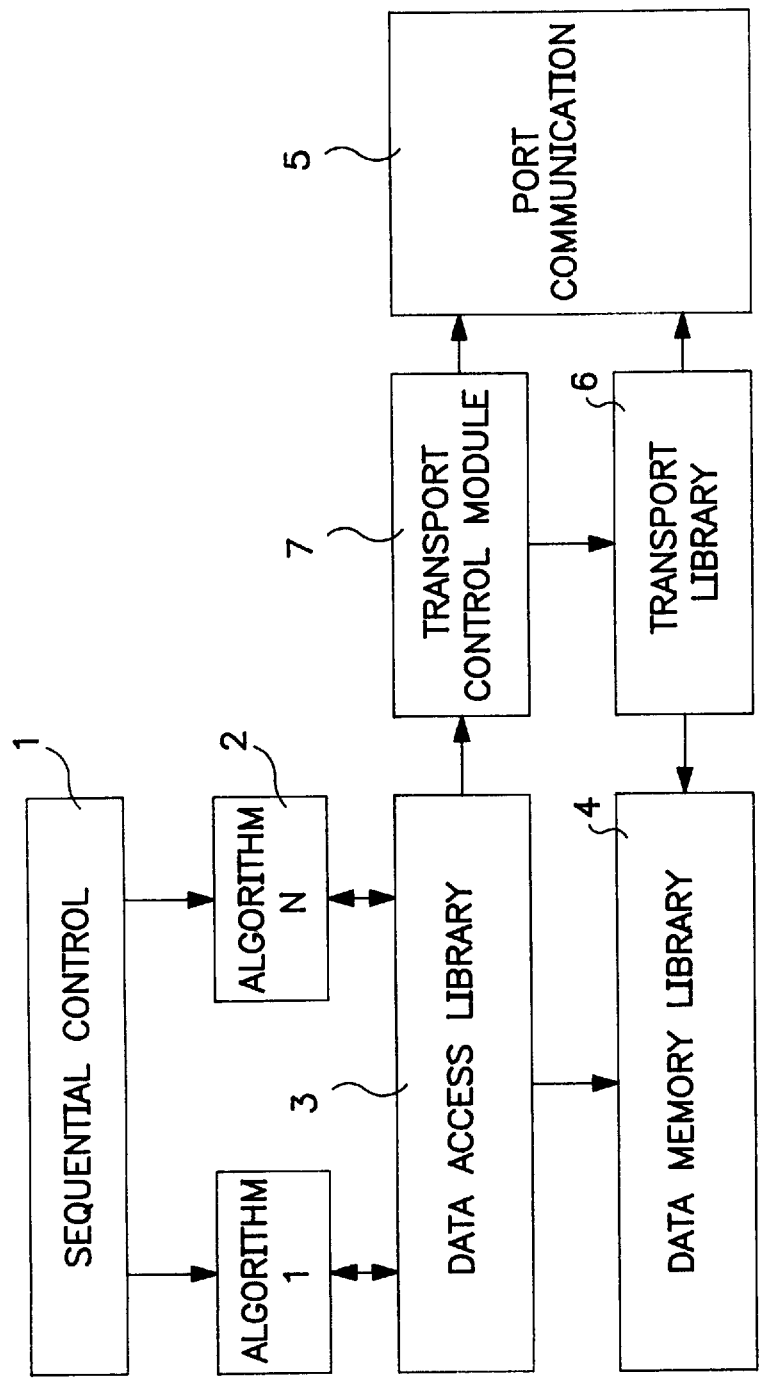
FIG. 2 is a block diagram illustrating the process of a multiple-process system.

In the multiple-process system shown in FIG. 2, the user determines the process division and data distribution using a process or sequential control 1 for job sequencing. The data model of the data storage comprises objects, links and attributes. An object is always an object of the application, for example a concrete document or a character. Attributes are associated with the objects. An attribute is a descriptive feature of an object, for example size or a pixel image. An object belongs to an object type, and an attribute belongs to an attribute type. All types are to be defined by the user. Objects are characterized by an unambiguous object identification and the object type, while attributes are characterized by the object identification, the attribute type and the data record specific to the attribute. Relationships between the objects are represented by links. Links are of a binary nature; they connect exactly two objects. Links are typified as, for example, parent link or sibling link. All link types are defined by the user. Links have optional alternatives. Thus, for example, a plurality of alternative solutions of a backtracking algorithm can be processed. Links are characterized by the source object recognition, the target object recognition, the type and the alterative number.

Using this data model as a basis, the user can define a data scheme with an arbitrary number of object types, link types and attributes. In addition, consistency conditions can be formulated: link types and attribute types can be limited to use with specific object types, links can be declared as unidirectionally or bidirectionally useful, and their cardinality (1:1, 1:n or n:n) can be determined. The alternative numbers permit even links of different types to be combined to form alternative paths. In particular, the sequence of object, link and attribute accesses are determined by the respective recognition problem.

In general, in a type-recognition system, a recognition process comprises a combination of processing steps of two different types: segmenting steps and describing steps. In a segmenting step, an image or an image element is broken down into a number of elements, or a number of image elements is combined to form a higher element, that is, a structure is laid over an image or a structure is recognized in the image. For example, an image is broken down into a hierarchical quantity of contiguous areas, partial quantities of contiguous areas are combined to form lines, lines are broken down into a sequence of words, and the words are broken down into a sequence of characters. In a describing step, data of any type are generated to form image elements. For example, a contour description is generated at a contiguous area, a circumscribing rectangle and a histogram are generated at a line, and a classification result is generated at a character. The results of a segmenting step are stored as objects having links. The results of a describing step are stored as attributes. An attribute is always associated with exactly one object. The algorithms 1–N (2) are arbitrary recognition algorithms. Algorithms are often performed in the system in the form of a pipeline, with each algorithm receiving the results of its predecessor. Client/server relationships also exist, such as those having a plurality of alternatives or competing transmitters or receivers. All of the algorithms receive their input data by way of the data access library 3, and output their output data by way of this library. Therefore, data access always remains the same for the algorithms, regardless of whether data are kept in permanent storage on a disk or in volatile storage in the main memory, centrally or distributed. The algorithms can therefore be built into the different system configurations without being changed.

Table 1 shows a simple scheme for a system for finding lines and words in a document.

TABLE 1

```
// Object--Definitions:
object DOCUMENT;
object LINE;
object WORD;
// Connection--Definitions:
link DOCUMENT_LINK (usage = "unidirectional," cardinality = "1:n");
link FIRST_LINK (usage = "bidirectional," cardinality = "1:1");
link NEXT_LINK (usage = "bidirectional," cardinality = "1:1");
// Attribute--Definitions:
attribute
{
    INT16 width;
    INT16 height;
    UINT8 bitmap [IMAGE_ATT.bitmap_size]; // variable-length field
}
    IMAGE_ATT; // screen image
attribute
{
    INT32 min_col; // top left corner
    INT32 min_row;
    INT32 max_col; // bottom right corner
    INT32 max_row;
}
    BOX_ATT; // circumscribing rectangle
// Consistency conditions:
describe DOCUMENT { IMAGE_ATT; }
describe LINE { BOX_ATT; }
describe WORD { BOX_ATT; }
connect DOCUMENT_LINK
{
    ROOT -> DOCUMENT; // ROOT is the predefined root object
}
connect FIRST_LINK
{
    DOCUMENT -> LINE;
    LINE -> WORD (alternatives = 1);
}
connect NEXT_LINK
```

TABLE 1-continued

```
{
    LINE -> LINE;
    WORD -> WORD (alternatives = 1);
}
```

Each data storage can receive a plurality of documents. They can be attained by way of a 1:n connection document link starting from the predefined root object ROOT. For each document, it can give a list of lines; for each line, again two alternative lists for words. Lines and words are described with circumscribing rectangles that indicate the position of the lines and words in the screen image of the document. As Table 1 shows, the definition of the data scheme is preferably effected by means of a data-definition language.

The data access library 3 includes functions for writing, reading and clearing objects, connections and attributes, and functions for generating, opening, closing and eliminating local data storages. The data access library 3 is generated for a given data scheme by a generator that interprets the data-definition language. The generated data-storage library is set up on scheme-independent data-storage libraries 4, which embody the storage of data, for example on disk or in real time in the main memory.

In accordance with the invention, a port communication 5 is the basis for the data-exchange mechanism between local data storages having distributed memories. A process comprising recognition algorithms can include an arbitrary number of ports of different types (input port, output port, client or server port), from which it reads input data and onto which it writes output data. In particular, job data can be sent by way of client ports, and result data can be subsequently received. A process receives job data by way of a server port, and can subsequently send result data to the sender of the job. The number of ports and their type specification for a process are determined by static configuration; the same applies to which output ports of which processes are connected to which input ports of which processes, and which client ports of which processes are connected to which server ports of which processors. Therefore, the location and number of communication partners remain concealed from a process. Not only unidirectional unicast connections, but generally unidirectional or bidirectional unicast or multicast connections, can be defined between the ports of a plurality of processes. Connections of different source ports can run together at a single target port. Furthermore, it is possible to establish alternative connections. In this instance, with each transmission, one of the connections is selected, using a predetermined strategy, at a port having alternative connections. Table 2 shows the port connections for the process system for a line and word search that already forms the basis of the data scheme in Table 1.

TABLE 2

```
process
{
    clt_port LINE_OUT_WORDS_IN;
}
    FIND_LINES;
process
{
    srv_port LINE_IN_WORDS_OUT;
}
    FIND_WORDS_FAST;
process
```

TABLE 2-continued

```
{
    srv_port LINE_IN_WORDS_OUT;
}
    FIND_WORDS_SLOW[2] ; // multiple activation
connect FIND_LINES.LINE_OUT_WORDS_IN;
{
    multicast
    {
        FIND_WORDS_FAST.LINE_IN_WORDS_OUT;
        select round.robin // selection stategy "round"
        {
            FIND_WORDS_SLOW[0] .LINE_IN_WORDS_OUT;
            FIND_WORDS_SLOW[1] .LINE_IN_WORDS_OUT;
        }
    }
}
```

Here a process searches for lines and, for each found line, assigns two processes that search the words with alternative methods. The slower of the two word-searching processes is activated twice, so that it does not become a throughput bottleneck. The implementation of the line-searching process is completely independent of this process division, because the line-searching process only makes lines available at its client port, and receives words there.

The port communication permits already-bound programs to run in different system configurations, because the port connections are produced without necessitating re-compilation or re-binding of the involved processes. For example, a process that forms a throughput bottleneck can be multiplied simply, such as the process Find_Words_Slow shown in Table 1. With multicast connections, data flows can be duplicated and further processed in a plurality of paths, such as the processes Find_Words_Slow in Table 1. With port communication, compiled and bound software modules bear a certain similarity to hardware modules. Corresponding to the connections of hardware modules, software modules developed with port communication have a specific number of ports, which can be freely connected according to the data present and anticipated there.

With functions of the transport library 6, predetermined data portions or sequences of data portions can be selected from a local data storage and sent via a predetermined port, or received at a predetermined port and placed into a predetermined, local data storage. Such data portions can be objects, links, attributes, partial trees or partial graphs of objects and links having attributes. Object identifications can be mapped from system-wide, unambiguous object names (process identification+data storage identification+object identification+time stamp) and vice versa. The time stamp is a protective mechanism with which objects from different generations of data storages can be distinguished from one another. Object copies in multi-process systems can be recognized as such with this type of system-wide, unambiguous name mapping.

The exchange of data between processes comprising recognition algorithms is exclusively effected in that, due to the calling of access functions from the data access library 3, predetermined data portions are sent to predetermined ports or received by them. The fundamental idea is to couple the reception of data portions to reading access of data not yet present in a local data storage, and to couple the sending of data portions to successful data writing.

In the simplest case, the reception of the input data for the recognition algorithms of a process are hung on the opening of a local data storage and, correspondingly, on the transmission of the output data when a local data storage is closed. With each of the functions of the data access library, a hook is provided on which the corresponding functions can be hung. These hook functions for one process are preferably bundled in a module 7, so that all activities for the exchange of data between the local data of the local data storages of a process are combined with the data storages of other processes.

The example described below is intended to demonstrate the implementation of applications in a type-recognition system.

The following algorithms are intended to find text blocks and lines in a document, with the aid of histogram techniques.

Algorithm 1: zone creation

Divides a DOCUMENT (i.e., its smudged contiguous regions) into zones. The DOCUMENT is present as a length of smudged contiguous areas (VZG), with a contiguous region comprising a quantity of adjacent black raster points in the screen image; a smudged contiguous area is a contiguous area in a screen image smudged by dilatation.

Input data:

A DOCUMENT object on which VZG objects (smudged contiguous areas) having VZG_LINK links hang. The VZG objects are respectively described with two attributes (ATT1 and ATT2).

Output data:

ZONE objects that hang on the DOCUMENT object via ZONE_LINK links and with which respective VZG objects are associated via VZG_LINK links.

Algorithm 2: Histogram calculation (histogram type 1)

Calculates a histogram from the smudged contiguous areas of a zone.

Input data:

A ZONE object on which VZGs with VZG_LINK links hang.

The VZG objects are described by ATT1 attributes.

Output data:

A HISTO1 attribute for the ZONE object.

Algorithm 3: Histogram calculation (histogram type 2)

Calculates a histogram from the smudged contiguous areas of a zone.

Input data:

as in algorithm 2

Output data:

A HISTO2 attribute for the ZONE object.

Algorithm 4: Histogram calculation (histogram type 3)

Calculates a histogram from the smudged contiguous areas of a zone.

Input data:

as in algorithm 2, except with ATT2 attributes instead of ATT1 attributes

Output data:

A HISTO3 attribute for the ZONE object.

Algorithm 5: Histogram evaluation (histogram type 1)

Evaluates a zone histogram.

Input data:

A ZONE object having a HISTO1 attribute.

Output data:

(not relevant for the example)

Algorithm 6: Histogram evaluation (histogram type 2)
Evaluates a zone histogram.
Input data:
A ZONE object having a HISTO2 attribute.
Output data:
(not relevant for the example)
Algorithm 7: Histogram evaluation (histogram type 3)
Evaluates a zone histogram.
Input data:
A ZONE object having a HISTO3 attribute.
Output data:
(not relevant for the example)

The above algorithms could be performed one after the other, in the sequence of their enumeration, within a process. A possible starting point for parallelization is the calculation of the zone histograms. The calculation of a histogram type for a zone is independent of the histogram calculation for other zones. The algorithms can therefore be stored in parallel processes. It is assumed that the calculation of a histogram of type 3 lasts significantly longer than the calculation of a histogram of type 1 or 2. The corresponding process should therefore be doubled so that two zones can be processed in parallel. The following processes result:

Process 1: zone process zone creation and histogram evaluations (algorithms 1, 5, 6, 7)

Process 2: histogram process (histogram type 1) histogram calculation for histogram type 1 (algorithm 2)

Process 3: histogram process (histogram type 2) Histogram calculation for histogram type 2 (algorithm 3)

Process 4: histogram process (histogram type 3) histogram calculation for histogram type 3 (algorithm 4)

Process 5: histogram process (histogram type 3) histogram calculation for histogram type 3 (algorithm 4)

The procedure is as follows:
Step 1: Creation of a data scheme, Table 3

TABLE 3

```
// Object definitions:
object MAILPIECE;
object ZONE;
object VZG;
// Link definitions:
link MAILPIECE_LINK (usage = "bidirectional," cardinality = "1:n");
link ZONE_LINK (usage = "bidirectional," cardinality = "1:n");
link VZG_LINK (usage = "bidirectional," cardinality = "1:n");
// Attribute definitions:
attribute { ... } ATT1;
attribute { ... } ATT2;
attribute { ... } HISTO1;
attribute { ... } HISTO2;
attribute { ... } HISTO3;
// Consistency conditions:
describe MAILPIECE
{ ...
}
describe ZONE
{
    HISTO1;
    HISTO2;
    HISTO3;
}
describe VZG
{
    ATT1;
    ATT2;
}
```

TABLE 3-continued

```
connect MAILPIECE_LINK
{
    ROOT -> MAILPIECE;
}
connect ZONE_LINK
{
    ROOT -> ZONE;
    MAILPIECE -> ZONE;
}
connect VZG_LINK
{
    MAILPIECE -> ZONE;
    ZONE -> VZG;
}
```

The data access library 3 is generated from the data scheme, FIG. 2.

This step is independent of whether and how parallelization takes place.

Step 2: Implementation of the algorithms

This step is also independent of whether and how parallelization takes place, perhaps with a slight limitation: in a divided system, it is important that the point at which the output data of an algorithm have been stored in their entirety can be recognized, in some form. In the algorithms for histogram calculation, this is trivial, because the output data only comprise one attribute. In the algorithm for zone creation, however, it is not so simple. In this case, a ZONE object, a ZONE_LINK link from the DOCUMENT object to the ZONE object and VZG_LINK links from the ZONE object to its VZG objects are written. Completion of the task can only be identified when the ZONE_LINK links are entered at the end.

A consideration in the implementation of any algorithm is in which order the output data would be put into memory most usefully. If an algorithm creates, for example, a tree of objects, the root object of the tree should always be hung in the overall database at the end.

Step 3: Implementation of the local job sequencing, FIG. 2

The calling of the histogram evaluations is an interesting feature of the local job sequencing of the zone process. As specified above, they should be effected in the order in which the histograms are available.

The zone process must first produce port connections to the histogram processes prior to the first data transport.

The initialization of the port communication is explicitly contained in the local job sequencing of the histogram processes. It comprises the setting of the process name and the initiation of connection production.

Step 4: Creation of the port configuration, Table 4

TABLE 4

```
// Process definitions:
process
{
    clt_port HISTO12_CLIENT_PORT;
    clt_port HISTO3_CLIENT_PORT;
}
    ZONE_PROCESS;
process
{
    srv_port HIST01_SERVER_PORT;
}
    HISTO1_PROCESS;
process
{
```

TABLE 4-continued

```
    srv_port HISTO2_SERVER_PORT;
}
    HISTO2_PROCESS;
process
{
    srv_port histo3_server_port;
}
    HISTO3_PROCESS[2];
    // Connections of the ports:
    connect ZONE_PROCESS.HISTO12_CLIENT_PORT
    {
    multicast
    {
        HISTO1_PROCESS.HIST01_SERVER_PORT;
        HISTO2_PROCESS.HIST02_SERVER_PORT;
    }
}
connect ZONE_PROCESS.HISTO3_CLIENT_PORT
{
    select
    {
        HISTO3_PROCESS[0].HIST03_SERVER_PORT;
        HISTO3_PROCESS[1].HIST03_SERVER_PORT;
    }
}
```

The zone process must make available two different data portions per zone (the types 1 and 2 histogram processes require VZG objects having ATT1 attributes; the type 3 histogram processes require VZG objects having ATT2 attributes). It therefore requires two ports. The ports are client ports, because result data are expected for the data that have been made available.

The histogram processes each have a server port, by way of which they receive their input data and send the output data back to the user. The server ports of the types 1 and 2 histogram processes are connected via a multicast connection to the same client port, because they need the same input data. The two copies of the type 3 histogram process are called upon alternatingly because their server ports are connected to the same client port by way of a selector connection.

Step 5: Implementation of the transport control module 7, FIG. 2

In the transport control modules of the zone process, the output data of algorithm 1 are sent as a partial tree during writing of the zone_events.

The reading out of the local data storage and packaging of the data during transmission, and the calling up and writing of the data during reception, as well as conversion of local object identifications into global object names and vice versa, are concealed from the function of the transport control in the transport library, FIG. 2, Table 4.

We claim:

1. A method of pattern recognition by means of processes comprising recognition algorithms in a multiple-process environment and a distributed data storage whose data model comprises objects, links for connecting objects, and attributes for writing, wherein the writing, reading and clearing of objects, links and attributes as well as the creation, opening, closing and elimination of data storages are effected by means of data access functions, wherein each process is exclusively allocated a predetermined number of ports for reading input data and writing output data, and the exchange of data between processes is effected implicitly in that data portions are sent to the data storage or received due to the calling of the data access functions.

2. A method according to claim 1, wherein predetermined data portions or sequences of data portions are selected by means of transport functions combined in a transport library, and sent by way of predetermined ports, or data portions are received at predetermined ports and placed in a data storage.

3. A method according to claims 1, wherein objects, links, attribute, partial trees or partial graphs of objects are provided as data portions.

4. A method according to claims 1, wherein input data are received due to an opening of a local data storage or a reading access to an opened, local data storage.

5. A method according to claims 1, wherein output data are sent due to a closing of a local data storage or a writing access to a local data storage.

6. A method according to claims 1, wherein alternative connections are provided between the ports, which connections can be respectively selected according to a predetermined strategy.

7. A method according to claim 1, wherein input ports, output ports, client ports and server ports are provided.

8. An apparatus for pattern recognition having N processors for processes comprising recognition algorithms, wherein the data model comprises objects, links for connecting objects, and attributes for describing, with data access functions being provided for writing, reading and clearing objects and for creating, opening, closing and eliminating data storages, and wherein the recognition algorithms have no knowledge of the implementation of data storage, further comprising local data storages for distributed storages.

9. An apparatus according to claim 8, wherein personal computers, workstations and co-processor networks that communicate with one another by way of a network are provided as processors.

* * * * *